June 4, 1935.  R. S. REYNOLDS  2,003,494
LAMINATED MATERIAL
Filed May 21, 1934
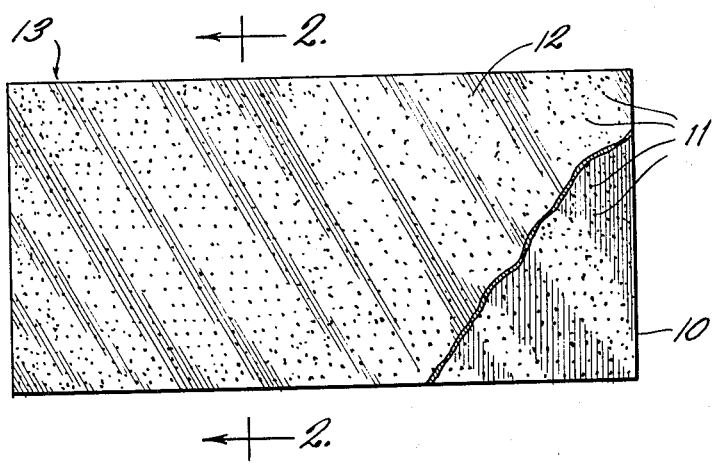
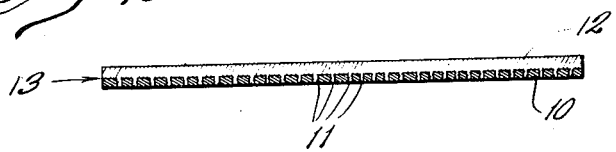
Inventor:
Richard S. Reynolds Patented June 4, 1935

2,003,494

UNITED STATES PATENT OFFICE 2,003,494

LAMINATED MATERIAL

Richard S. Reynolds, Glen Cove, N. Y., assignor to Reynolds Research Corporation, New York, N. Y., a corporation of Delaware Application May 21, 1934, Serial No. 726,701

9 Claims. (Cl. 154—2)

This invention has to do with laminated materials and relates particularly to a new material wherein the laminations consist of extremely thin sheets of metal foil and of a flexible transparent substance pressed into cohesive relation without the intervention of other adhesive material.

For its objects the present invention includes the provision of:

A new article of manufacture consisting of a sheet of metal foil and a sheet of transparent insulating material attached adhesively to a face thereof.

A novel moisture-proof material of metallic luster in thin and flexible sheet form adapting it to ease of manipulation for wrapping packages and the like.

An improved laminated material of metallic foil and transparent sheet material composed of rubber, cellulose, or derivatives thereof, the composite material being extremely thin yet possessing great strength.

With the above and other desirable objects in view the following description of the preferred embodiment of the invention is set forth in connection with the single sheet of drawing, hereby made a part of this specification, and in which:

Figure 1 is a plan view of the sheet of laminated material assembled in accordance with the present invention and with parts broken away to illustrate details of construction; and Figure 2 is a cross sectional view taken at the line 2—2 of Figure 1.

Like reference characters are used in the drawing and throughout the following description to denote similar parts of the illustrated form of the invention.

Reference should be had conjointly to Figures 1 and 2. The reference numeral 10 designates a sheet of thin metal foil, preferably too thin for self-support, that is, of a thinness making necessary the provision of reinforcing for the sheet to withstand extensive handling, folding or physical stress from any cause.

Within the lamination 10 are a plurality of perforations or small apertures 11, which may be those sometimes occurring naturally in thin foil made conventionally, or which may be produced by impaling the lamination with a suitable instrument or device. The small perforations 11 may be formed by passing a series of minute electric discharges therethrough. Frequently the perforations 11 are referred to as pin-holes.

Such material, foil full of minute holes, is sometimes produced unintentionally during the rolling of the metal, certain conditions not now definitely known or capable of being foreseen often causing the production of much of such foil. This foil heretofore has been considered waste and if used had to be remelted and re-rolled. This material is an excellent material for use in the presently described laminated sheet.

Applied to one or both faces of the metal foil sheet 10 is a sheet or sheets 12 of transparent substance, of which the principal ingredients are preferably rubber, cellulose or derivatives thereof. The sheet 12 is such that it becomes softened and somewhat tacky upon a face by subjecting such face to heat.

Assembly of the two laminations 10 and 12 is accomplished by pressing them together while the face of the lamination 12 adjacent to the metallic lamination is softened from heat. It is possible to first apply heat to the face of the lamination 12 and thereafter press the two laminations together, or heat may be applied to the outer face of the lamination 10 and conducted through the metal to the face of the transparent lamination while the latter is pressed to the opposite side of the metal lamination. For example, the two laminations may be pressed between platens of which the platen in contiguity with the metal foil is heated.

The heat softened film of the lamination 12 conforms intimately with the microscopic irregularities in the contiguous face of the foil and pervades the natural minute interstices therein as well as the perforations 11 to become conglutinated with the foil lamination upon cooling and resolidifying.

Another method of producing the sheet includes the spreading of a thin film of material over the foil, the plastic material whether on one side or on both becoming anchored in the apertures 11 of the foil sheet to provide an intimate adhesion between the foil and the rubber or cellulose material.

When assembled in any of the manners described the two laminations 10 and 12 form the new composite sheet 13. The uses to which the composite sheet of laminated material is adapted are manifold. Because of the extreme thinness of the laminations 10 and 12, the sheet 13 is relatively thin, flexible and readily foldable for use as an efficient artistic wrapping material. The lamination 12 is impervious to all moisture and dampness thereby preserving the relative humidity within a space enclosed by a sheet 13. The moisture excluding qualities of the lamination 12 serve to protect the inner face of the metal lamination from moisture thereby precluding corrosion of such lamination and preserving its metallic luster.

Other uses are found for the new laminated article of manufacture 13 in the electrical and heat insulating industries, this being because the lamination 12 is an insulator of heat and electricity. The tough tenacious character of the lamination 12 further lends to the laminated article 13 such strength as is necessary in these various uses.

What is claimed as new and is desired to be secured by Letters Patent of the United States is:

1. A laminated sheet comprising a first lamination of porous metal foil, and a second lamination of tenacious flexible substantially transparent material extending into the pores of the metal foil.

2. A laminated sheet comprising a porous lamination of metal foil, and laminations of tenacious flexible substantially transparent material extending into and through the pores of the foil sheet.

3. An article of manufacture comprising in combination a lamination of porous metal foil, too thin for self support, and a lamination of substantially transparent material of like thinness having qualities of flexibility and tenacity while at atmospheric temperatures and becoming adhesive upon application of heat thereto, said laminations being arranged in intimate contact with the transparent material extending into the pores of the foil.

4. An article of manufacture comprising in combination a lamination of metal foil of a thinness unadaptive of self support and being porous, the pores being microscopic in character, and a similarly thin substantially transparent lamination of a transparent material having the physical qualities of flexibility and tenacity when at atmospheric temperatures and becoming soft upon application of heat thereto, said transparent lamination having integral therewith extensions of material projecting into the pores in the foil sheet.

5. An article of manufacture comprising in combination a lamination of porous metal foil of a thinness unadaptive of self support, and a similarly thin substantially transparent lamination of fusible cellulosic material having the physical qualities of flexibility and tenacity when at atmospheric temperatures, said laminations being in intimate contact with the cellulose material penetrating the pores of the foil sheet for added binding effect.

6. An article of manufacture comprising in combination a lamination of metal foil of a thinness unadaptive of self support and having therein a plurality of pinholes, and a similarly thin substantially transparent lamination of a fusible material having the physical qualities of flexibility and tenacity when at atmospheric temperatures and fusing upon application of heat, said laminations being in physical contact with the material of one penetrating the other to the depth thereof to provide an additional binding effect.

7. An article of manufacture comprising in combination a lamination of metal foil of a thinness unadaptive of self support and having therein a plurality of closely spaced pinholes, and a similarly thin substantially transparent lamination of fusible cellulosic material having the physical qualities of flexibility and tenacity when at atmospheric temperatures and fusing upon application of heat, said laminations being in intimate flat contact with the fused material penetrating the pinholes in the foil sheet to at least the thickness of such foil sheet.

8. That process of making a laminated material which comprises the steps of preparing metal foil with minute perforations therethrough, applying thereto a sheet of material which is plastic upon being heated, and pressing the foil and material together while applying heat sufficient to render such material plastic.

9. That process of making a laminated material which comprises the steps of preparing metal foil with minute perforations therein, applying thereto a thin sheet of transparent material which becomes plastic and adhesive on heating, applying heat sufficient to render such material plastic and adhesive, and compressing the material and foil one upon the other to force portions of the material into the perforations in the foil.

RICHARD S. REYNOLDS.

DISCLAIMER 2,003,494.—*Richard S. Reynolds*, Glen Cove, N. Y. LAMINATED MATERIAL. Patent dated June 4, 1935. Disclaimer filed July 16, 1936, by the assignee, *Reynolds Research Corporation*.

Hereby disclaims claims 1, 2, and 8 of said Letters Patent.
[*Official Gazette August 18, 1936.*]